Aug. 19, 1952  A. A. HOLLANDER  2,607,548
FISHING REEL
Filed June 29, 1950
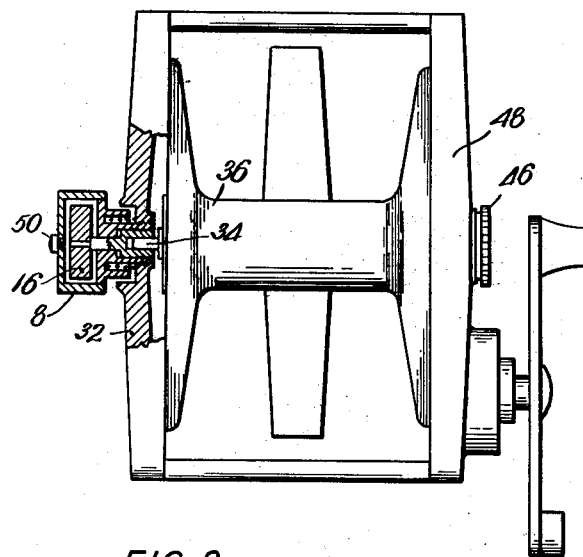
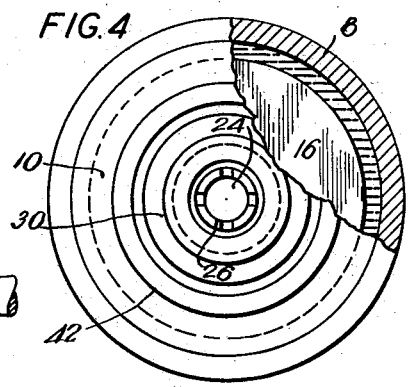
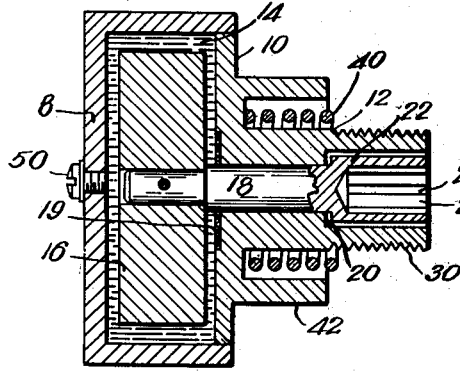
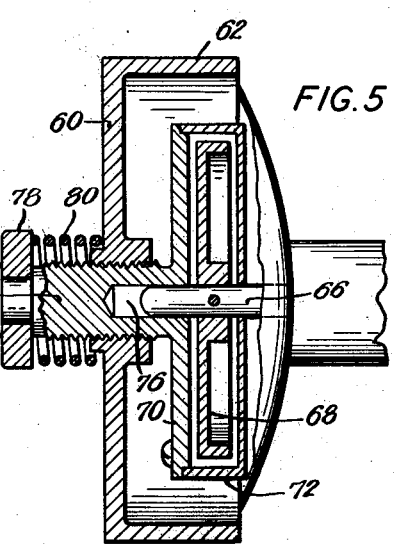
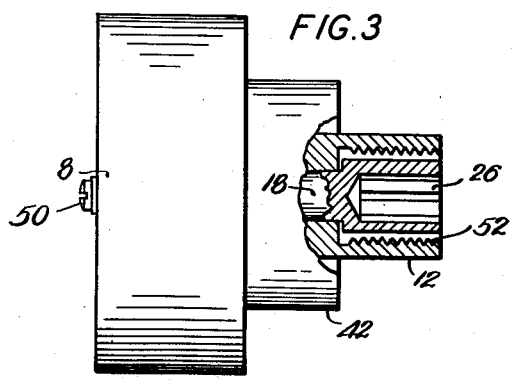
INVENTOR.
Albert A. Hollander
BY Kenway, Jenney,
Witter & Hildreth,
attys.

Patented Aug. 19, 1952

2,607,548

UNITED STATES PATENT OFFICE 2,607,548

FISHING REEL

Albert A. Hollander, Weymouth, Mass.

Application June 29, 1950, Serial No. 171,075

3 Claims. (Cl. 242—84.5)

The present invention relates to fishing reels, and more particularly to improvements in drags therefore, to prevent backlash in casting. The present application constitutes a continuation in part of my copending application Serial No. 130,767 filed December 2, 1949, now abandoned.

In bait casting, or casting with a plug, it is often difficult to prevent overrunning of the reel under the pull of the line. Generally an attempt is made to "thumb" the reel, applying just enough friction to slow down the reel as the limit of the cast is reached, but without putting any unnecessary drag on the reel to cut short the cast. To do this properly requires considerable skill, and even with practice the reel sometimes overruns and creates a bad snarl in the line.

To overcome this difficulty, attempts have been made to incorporate within the reel structure various forms of drag devices, by which the reel spool may be restrained lightly against free spinning during casting. Thus, reels have been made embodying within the reel structure a form of eddy-current braking. This however has resulted in a relatively complicated reel structure, of special design and therefore considerably more costly than the conventional equipment.

It is therefore an object of the present invention to provide a reel drag of simple construction and arrangement, but nevertheless highly effective in preventing overrunning of the reel during casting.

More specifically, the invention concerns the provision of a drag device that may readily be attached to existing types of fishing reels or incorporated as a built-in feature with but slight modification of the reel structure, to impart drag characteristics and backlash protection substantially as effective as afforded by the more complicated built-in drag devices.

To this end, the invention involves, according to one of its features, the provision of a simple and compact accessory device, which may quickly be attached to a conventional reel and coupled to the spool thereof to provide a drag characteristic wherein the retarding force is function of speed, so that an increase in the speed of the spool gives rise to a proportional increase in the retarding force. Such a characteristic is provided, in the reel of the illustrative embodiment, by viscous damping means, although the invention is not, except as limited by the appended claims, restricted to the use of viscous damping.

Alternatively, the invention may be embodied in the reel structure as a built-in drag of simple construction and arrangement employing, preferably, viscous damping means and with provision for simple but effective adjustment of the drag characteristic in the same fashion as in the accessory drag device.

The several features of the invention will appear from the following description, taken in conjunction with the accompanying drawings, in which Fig. 1 is a plan view of a typical fishing reel having the accessory device installed thereon, the device being shown in section and a portion of the reel being broken away; Fig. 2 is an enlarged sectional view of the drag attachment shown in Fig. 1; Fig. 3 is a view of a generally similar device, partly broken away to illustrate a different form of connector or adaptor sleeve; Fig. 4 is an end view, partly broken away, of the device of Fig. 2; and Fig. 5 is a detail plan view, largely in section showing the end portion of a reel having the drag embodied within the reel structure as a built-in feature.

As has already been indicated, the drag device illustrated in the drawings is of the viscous damping type, wherein a rotating element runs within and is retarded by a damping fluid. The device illustrated in Figs. 1–4 comprises a cup-shaped housing or shell 8, the open end of which connects with the outwardly extending flange 10 of sleeve 12 to form a short cylindrical chamber 14. Within this chamber is a rotor 16 with clearance provided between the casing and the end faces of the rotor, and around the periphery of the rotor, as illustrated. The rotor is illustrated as a solid disc, but it is obvious that a vaned rotor may be employed where somewhat greater drag is desired. Alternatively, other forms of damping than the fluid type may be employed, in which event the housing 8 could be omitted, leaving the flanged member 10 as the stationary member or stator of the damping means.

The rotor is secured to the end of a short shaft 18 journaled in a bore extending axially of the sleeve 12. A felt washer 19 assists in sealing against loss of damping fluid around the shaft. The outer end portion of the bore is slightly enlarged at 20 to provide clearance for the shaft end 22, which is of slightly greater diameter than the inner portion of the shaft. The shaft end is counter-bored to form a socket 24 having an internal diameter that will provide a frictional fit with the outer end of the shaft of the reel spool with which the device is to be used. To facilitate such frictional engagement, the shaft end 22 in the region of the counterbore may be split or slotted at one or more points to divide the socket into slightly resilient splines 26.

To permit ready attachment of the drag device to a conventional fishing reel, the end of the sleeve 12 is threaded at 30 to fit the internally threaded socket in the reel end plate 32, in place of the end bearing normally mounted therein. When the drag device is so mounted on the reel, the stub shaft 34 of the spool 36 fits within the socket 24 of shaft 18, and the latter, being journaled in the sleeve 12, provides the bearing for the outboard end of the spool, in place of the conventional end bearing (similar to the bearing 46 shown in the other end plate 48) that was removed to permit attachment of the drag device.

To assist in retaining the device in position on the reel, a coil spring 40 is preferably arranged on the sleeve within a cup-shaped shroud 42 so as to bear against the reel end plate when the drag device is screwed into place. By reason of the frictional engagement provided by the spring, the device is held against free rotation relative to the reel even though the sleeve may not have been screwed into the end plate to the limit of the threads. However, the device may be rotated, when desired, to vary the clearance between one face of the rotor and the end wall of the housing and thereby permit adjustment of the amount of drag developed to suit various weights of fishing plugs. To this end, the axial clearance between the enlarged end 22 of shaft 18 and the bore 20 permits shifting the position of the rotor 16 within the housing by screwing or unscrewing the device a turn or two within the reel end plate.

As has already been indicated, the drag is of the viscous type, and to this end the space between the rotor and the housing is substantially filled with a fluid such as a light oil, preferably one having a relatively low viscosity index so as to minimize the effects of temperature variations on the drag characteristics. Thus, it has been found satisfactory to employ a relatively light grade of motor oil, or one of the silicone fluids or oils. If desired, provision may be made for replenishing the liquid through a filler hole closed by a screw 50.

It will be apparent that the drag device illustrated and described is highly effective to accomplish its intended purpose, for it provides direct connection to the reel spool without the use of intermediate driving means such as gears or belts. Furthermore, there is no increase in bearing friction, nor any alignment problem, since the device embodies a single bearing that serves as the bearing for the rotor and also for the spool, replacing the end bearing originally present. Furthermore, the presence of the damping fluid insures effective lubrication of the bearing.

The result is a smooth running device that provides enough drag or retardation at high speed to prevent overrunning of the reel at the end of a cast, yet adds little if any drag or friction at cranking speeds. Consequently, the device may be left on the reel, and no clutch or disconnect is necessary.

It will be apparent that installation of the device is extremely simple; it is only necessary to unscrew the end bearing from the end plate away from the crank and insert the threaded end 30 in its place. As the device is screwed in, the splined socket 24 is forced onto the shaft of the reel. After the limit of the insertion has been reached, the device may be backed off to free the reel, just as with the conventional bearing, and to provide clearance for the rotor within the housing. Through rotation of the housing, the clearance is adjustable to vary the end spacing between rotor and housing, and thereby to increase or decrease the amount of viscous drag provided.

As an alternative to the construction shown in Fig. 2, the modification shown in Fig. 3 may be employed, for use with reels that employ an end bearing with internal threads. Thus, the sleeve 12 is internally threaded at 52, the construction in other respects being identical with that illustrated in Fig. 3.

It is obvious that suitable modifications in the sleeve 12 may be made to adapt the device for connection to reels having other than standard forms of bearing mountings, so that the device may readily be attached merely by removing the original bearing and inserting the drag device in its place, and without injuring or modifying the reel structure in any way.

The several features of the drag may be embodied in a built-in structure, if desired, with only the drag adjustment knob exposed. Such a construction is illustrated in Fig. 5 wherein the reel end plate 60 is formed with a rim 62 to define a shallow chamber outwardly of the spool flange 64. Secured to the spool shaft 66 is a rotor 68 within a housing formed by flange 70 and cover 72 and containing the damping fluid. Like the previously described constructions, the housing is adjustable in an axial direction to vary the drag, with the housing likewise providing the end bearing for the spool.

The flange end 70 of the housing is, for this purpose, provided with an extension portion 74 externally threaded to be received within the threaded passage in the end plate 60. A bore 76 within the portion 74 provides the spool and bearing, with the depth of bore sufficient to permit an appreciable range of adjustment of the housing relative to the sides of the rotor, without causing binding of the spool shaft 66 within the bearing. A knurled end 78 secured to the extension 74 permits adjustment readily to be made, with coil spring 80 providing sufficient friction to retain the parts in adjusted position.

Like the previously described externally mounted accessory drag, the in-built embodiment makes use of a combined fluid housing and end bearing assembly axially adjustable to vary the degree of damping or drag to suit the requirements of the individual user. There results, in each of the arrangements, a simple, compact, but highly effective means for imparting the preferred drag characteristic to minimize over-run and back lash, without unnecessarily limiting the cast through excessive resistance.

While I have described my invention in terms of a device employing viscous drag, it will be understood that the invention is not so limited, but comprehends accessory drag devices adapted for attachment to conventional fishing reels in the manner disclosed and described, and embodying other forms of drag or damping between housing and rotor.

I claim as my invention:

1. In a fishing reel having a spool and end plates for supporting said spool, a housing having spaced walls, a rotor within the housing, said rotor consisting of a solid of revolution about its axis of rotation, the rotor and the housing having spaced, substantially smooth complementary surfaces, means connecting the rotor to the spool for rotation therewith, damping liquid within the housing for imparting viscous drag to the rotor upon rotation thereof, and means extending from the housing into screw-threaded connection with the reel end plate for supporting the housing in coaxial relation to the spool, said means being rotatable externally of the end plate to vary the spacing between said complementary surfaces of rotor and housing to control the amount of viscous drag imparted to the rotor by the damping fluid.

2. A viscous drag device for fishing reels comprising a housing having spaced walls, a rotor within said housing, said rotor consisting of a solid of revolution about its axis of rotation, the rotor and the housing having spaced, substantially smooth complementary surfaces, damping liquid within said housing, a threaded sleeve projecting from said housing for mounting the housing on the end plate of a fishing reel in place of the end bearing thereof, a shaft journalled within the sleeve portion of the device and carrying at one end the rotor, and a resilient socket on the shaft at the opposite end from the rotor, said socket being pressed onto the shaft end of the reel spool when the sleeve of the housing is screwed into the reel end plate.

3. A viscous drag device for fishing reels comprising a housing having spaced walls, a rotor within said housing in spaced relation to said walls, damping liquid within the housing, a screw-threaded sleeve projecting from the housing to make connection with the threaded fitting of the reel end plate in place of the reel end bearing, a shaft connected at one end to the rotor and extending through the threaded sleeve, the shaft and rotor having limited axial movement relative to the housing to vary the spacing between rotor and housing, means at the end of the shaft in the vicinity of the threaded end of the sleeve for connecting the shaft to the reel spool end when the device is screwed into the reel end plate, said housing being rotatable relative to the reel end plate to vary the thickness of the liquid layer intermediate rotor and housing.

ALBERT A. HOLLANDER.

REFERENCES CITED

The following references are of record in the file of this patent:

UNITED STATES PATENTS

| Number | Name | Date |
|---|---|---|
| 1,005,154 | Catucci | Oct. 10, 1911 |
| 2,198,231 | Schafer | Apr. 23, 1940 |
| 2,285,493 | Clickner | June 9, 1942 |
| 2,347,173 | Coxe et al. | Apr. 25, 1944 |
| 2,419,372 | Schneider | Apr. 22, 1947 |
| 2,443,249 | Jackson | June 15, 1948 |
| 2,443,294 | Bickle | June 15, 1948 |
| 2,508,217 | Brell | May 16, 1950 |

FOREIGN PATENTS

| Number | Country | Date |
|---|---|---|
| 15,670 of 1910 | Great Britain | Apr. 13, 1911 |